(12) United States Patent  
Yamamoto et al.

(10) Patent No.: US 8,806,373 B2  
(45) Date of Patent: Aug. 12, 2014

(54) DISPLAY CONTROL APPARATUS, DISPLAY CONTROL METHOD, DISPLAY CONTROL PROGRAM, AND RECORDING MEDIUM STORING THE DISPLAY CONTROL PROGRAM

(75) Inventors: Daisuke Yamamoto, Tokyo (JP);  
Atsushi Matsutani, Tokyo (JP);  
Toshisada Ishii, Tokyo (JP)

(73) Assignee: Sony Corporation (JP)

( * ) Notice: Subject to any disclaimer, the term of this patent is extended or adjusted under 35 U.S.C. 154(b) by 529 days.

(21) Appl. No.: 13/150,642

(22) Filed: Jun. 1, 2011

(65) Prior Publication Data  
US 2011/0302529 A1 Dec. 8, 2011

(30) Foreign Application Priority Data  
Jun. 8, 2010 (JP) ................................ P2010-131073

(51) Int. Cl.  
*G06F 3/048* (2013.01)  
*G06F 3/033* (2013.01)  
*G06F 3/14* (2006.01)

(52) U.S. Cl.  
USPC ............................ 715/830; 715/863; 715/864

(58) Field of Classification Search  
USPC .................. 715/800, 815, 834, 859, 863–864  
See application file for complete search history.

(56) References Cited

U.S. PATENT DOCUMENTS

| 2007/0279438 A1 | 12/2007 | Takakura et al. | |
| 2010/0077334 A1* | 3/2010 | Yang et al. | 715/769 |
| 2010/0211920 A1* | 8/2010 | Westerman et al. | 715/863 |
| 2010/0281435 A1* | 11/2010 | Bangalore et al. | 715/863 |

FOREIGN PATENT DOCUMENTS

| JP | 2004-201048 A | 7/2004 |
| JP | 2007-323543 A | 12/2007 |

* cited by examiner

*Primary Examiner* — Weilun Lo  
*Assistant Examiner* — Truc Chuong  
(74) *Attorney, Agent, or Firm* — Lerner, David, Littenberg, Krumholz & Mentlik, LLP (57) ABSTRACT

A display control apparatus includes an input unit configured to be operated to change the display state of a plurality of content items displayed on a display screen, a circling detector configured to detect a circling operation, detect the circling direction and number of revolutions thereof, and also determine an area enclosed by the circling operation to be a selection area, a content item search unit configured to search the plurality of content items for relevant content items that correspond to position information included inside the selection area, and a content display quantity adjuster configured to display or hide the relevant content items according to the circling direction, and in the case of a plurality of relevant content items, determine the number of relevant content items to display or hide from among the relevant content items on the basis of the number of revolutions.

12 Claims, 12 Drawing Sheets

DISPLAY CONTROL APPARATUS, DISPLAY CONTROL METHOD, DISPLAY CONTROL PROGRAM, AND RECORDING MEDIUM STORING THE DISPLAY CONTROL PROGRAM

CROSS-REFERENCE TO RELATED APPLICATION

The present application claims priority from Japanese Patent Application No. JP 2010-131073filed in the Japanese Patent Office on Jun. 8, 2010, the entire content of which is incorporated herein by reference.

BACKGROUND OF THE INVENTION

1. Field of the Invention

The present invention relates to a display control apparatus, etc., and more specifically, to a display control apparatus, a display control method, a display control program, and a recording medium storing the display control program that adjust the number of content items displayed by a display unit.

2. Description of the Related Art

When doing various work using a personal computer (PC), the number of content items (such as icons and thumbnail images, for example) displayed on a display screen may increase in some cases.

In order to solve this problem, technology has been conceived wherein a slider on a display screen is used to temporarily adjust the number of displayed content items.

This technology is display control technology that adjusts the number of displayed content items for the entire display screen or in folder units according to the width by which a slider is moved. Other technology that adjusts the number of displayed content items for the entire display screen is described in Japanese Unexamined Patent Application Publication No. 2004-201048.

SUMMARY OF THE INVENTION

However, with such display control technology, there is a problem in that the number of displayed content items is only adjusted for the entire display screen or in folder units.

In light of such issues, it is desirable to provide technology that adjusts the number of displayed content items within a given range.

A display control apparatus in accordance with an embodiment of the present invention includes an input unit configured to be operated to change the display state of a plurality of content items displayed on a display screen. In the case where the input unit is subjected to a user operation so as to enclose an arbitrary position on the display screen, it is detected whether or not the user operation is a circling operation from a trail from a start point to an end point of the user operation. If the detection result is a circling operation, the circling direction and number of revolutions in the circling operation are detected, and the area on the display screen enclosed by the trail is also determined to be a selection area. Additionally, the plurality of content items are searched for relevant content items that correspond to position information included inside the selection area. Also, the relevant content items are displayed or hidden according to the circling direction, and in the case of a plurality of relevant content items, the number of relevant content items to display or hide from among the relevant content items is determined on the basis of the number of revolutions.

According to the above-described configuration of a display control apparatus in accordance with an embodiment of the present invention, the displayed or hidden state of content items corresponding to position information included in a selection area can be controlled on the basis of the direction and number of revolutions in a circling operation.

DESCRIPTION OF THE PREFERRED EMBODIMENTS

Hereinafter, embodiments for carrying out the present invention will be described. The embodiment discussed hereinafter are ideal specific examples of the present invention. For this reason, various technically preferable limitations are imposed thereon. However, the present invention is not to be limited to these embodiments. For example, the numerical constraints of the respective parameters given in the explanation hereinafter are merely ideal examples, while the dimensions, forms, and positional relationships given in the respective drawings used to explain are likewise schematic.

The description will proceed in the following order.

<First embodiment (example of adjusting the number of displayed content items according to position information for a selection area)>
1. Configuration of display control apparatus
2. Operation of display control apparatus
<Second embodiment (example of determining selection area with an initial circling operation)>
1. Operation of display control apparatus <Third embodiment (example of automatically expanding selection area)>
1. Operation of display control apparatus
<Fourth embodiment (example of adjusting number of displayed content items within selection area)>

<First Embodiment>

Figure 1:
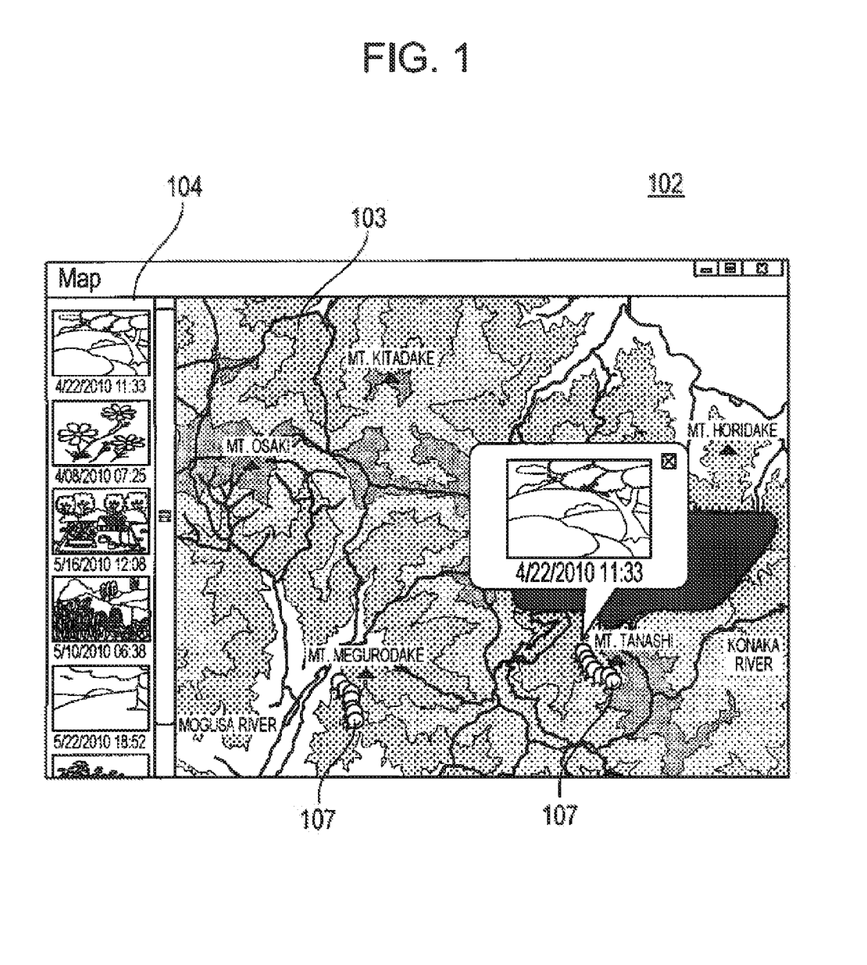
FIG. 1 is an explanatory diagram illustrating a map display program execution screen.

A display control apparatus in accordance with a first embodiment of the present invention will now be described with reference to FIGS. 1 to 9. FIG. 1 is an explanatory diagram illustrating a map display program execution screen. A map display program execution screen 102 includes a map display area 103 and an image list display area 104. A map is displayed in the map display area 103. The map has been generated on the basis of map information stored by a display control apparatus 110. Thumbnail images are displayed in the image list display area 104. The thumbnail images correspond to the subset of all images that were shot within the range indicated by the map from among all the images being stored by the display control apparatus 110. Additionally, markers 107 are displayed on the map. Each marker 107 indicates the position (latitude and longitude) where a thumbnail image's parent image was shot. In this example, the thumbnail images displayed in the image list display area 104 are equivalent to content items.

A display control apparatus 110 (see FIG. 2) in accordance with an embodiment of the present invention adjusts the number of displayed/hidden thumbnail images displayed in the image list display area 104 of the map display program execution screen 102, for example. Herein, the display control apparatus 110 is taken to generate the map display program execution screen 102 illustrated in FIG. 1 by using technology described in Japanese Unexamined Patent Application Publication No. 2007-323543.

(1. Configuration of Display Control Apparatus)

Figure 2:
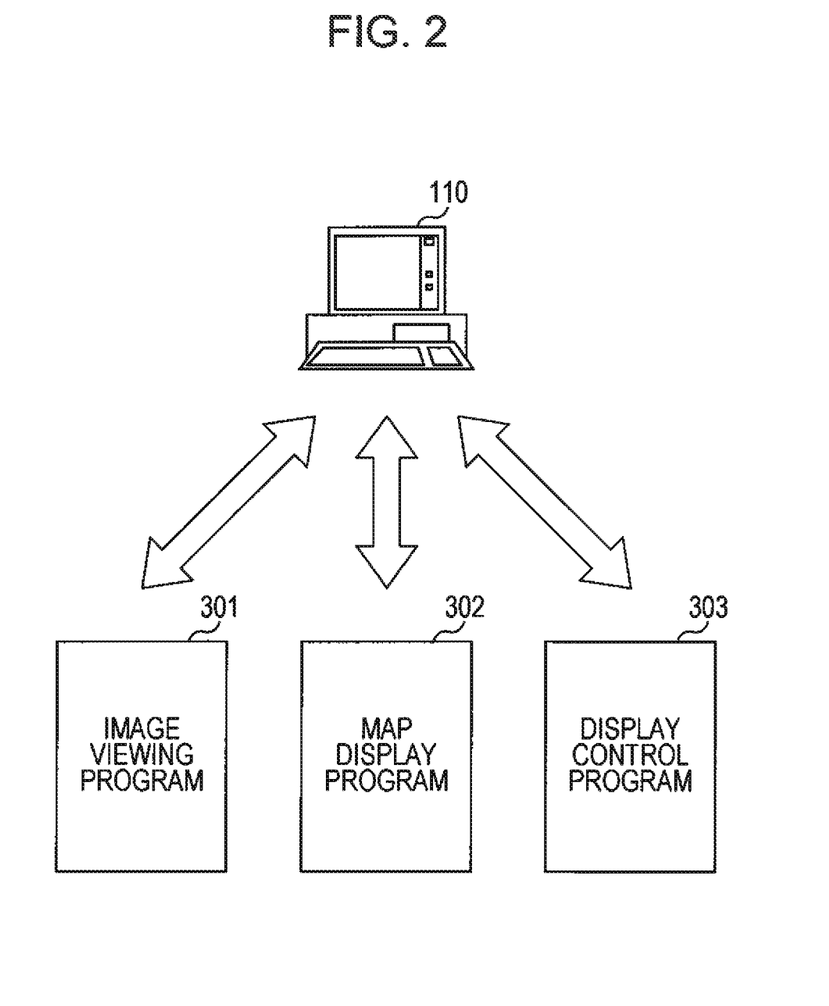
FIG. 2 is an explanatory diagram illustrating programs executed in a display control apparatus in accordance with a first embodiment of the present invention.

FIG. 2 is an explanatory diagram illustrating programs executed in a display control apparatus in accordance with a first embodiment of the present invention.

Programs executed in a display control apparatus 110 are generally divided into a an image viewing program 301, a map display program 302, and a display control program 303. In the case of executing an image viewing program 301, the image viewing program execution screen 351 illustrated in FIG. 9 of Japanese Unexamined Patent Application Publication No. 2007-323534 is generated. This image viewing program execution screen 351 is a screen in which all images stored in the display control apparatus 110 are displayed grouped by date.

In the image viewing program execution screen 351, images in an area enclosed by an O (a white circle) are selected (hereinafter referred to as selected images), and then a map display program launch icon 324 is clicked. In so doing, a map display program 302 is executed, and a map display program execution screen 102 (see FIG. 1) is generated. Thumbnail images of the selected images are displayed in the image list display area 104 of the map display program execution screen 102. Also, a map is displayed in the map display area 103, the map having a range and scale so as to include all positions where the selected images were shot.

If a display control program launch button (not illustrated) on the map display program execution screen 102 is clicked, a display control program 303 is launched. Then, an operation (hereinafter referred to as a circling operation) is performed on the map display area 103 of the map display program execution screen 102, such that the motion trail of the contact point between a touchscreen and a finger traces a rough circle (closed loop). In so doing, the display of thumbnail images in the image list display area 104 is changed for the images shot within the range enclosed by the motion trail on the map. The change in thumbnail image display is determined on the basis of the circling direction and number of revolutions in the circling operation. Herein, the relationship between the circling direction and number of revolutions in the circling operation versus the change in thumbnail image display will be described in detail with FIGS. 5 to 8. In this example, the circling operation is conducted using a touchscreen, but is not limited thereto. For example, a circling operation may also be conducted with a pointing device such as a keyboard or mouse, or with a gesture input device.

Figure 3:
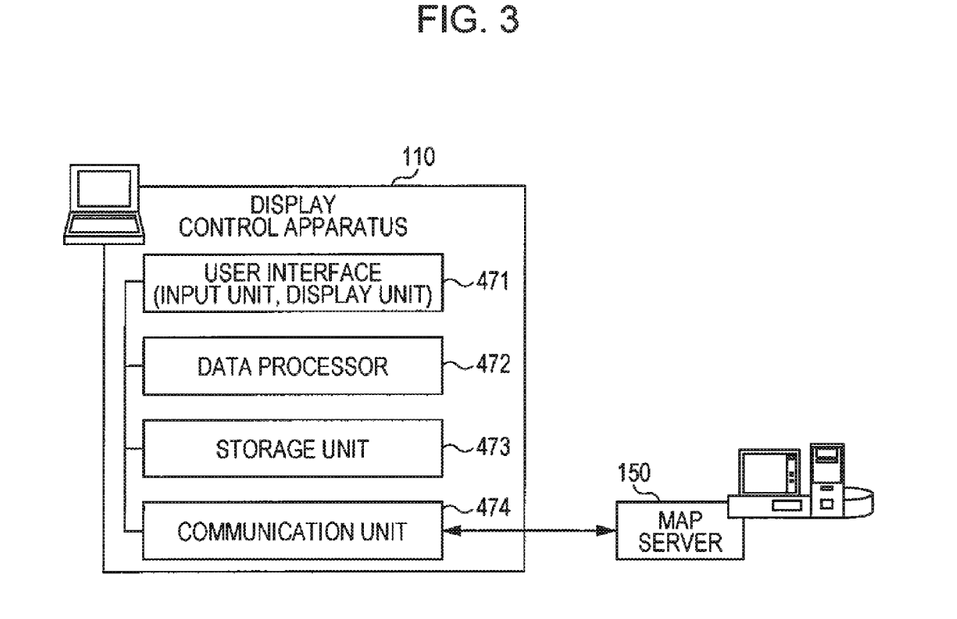
FIG. 3 is a block diagram illustrating a functional configuration of a display control apparatus in accordance with a first embodiment of the present invention.

Next, a functional configuration of a display control apparatus 110 will be described with reference to FIG. 3. FIG. 3 is a block diagram illustrating functions of a display control apparatus in accordance with a first embodiment of the present invention. A display control apparatus 110 is provided with a user interface 471 that acts as a data input/output unit, a data processor 472, a storage unit 473, and a communication unit 474.

The storage unit 473 stores the above-described image viewing program 301, map display program 302, and display control program 303, as well as various information utilized when these programs are executed. As described earlier, the various information utilized when these programs are executed may be map information, image data, thumbnail image data for the image data, as well as the image file paths, thumbnail image file paths, image position information (latitude and longitude), and image shooting date/time illustrated in FIG. 5 of Japanese Unexamined Patent Application Publication No. 2007-323543. The respective information is associated with each other.

The storage unit 473 also stores information associating respective coordinates (hereinafter referred to as map coordinates) indicating latitudes and longitudes on the map of the map display program execution screen 102 (see FIG. 1) with respective coordinates (hereinafter referred to as display unit coordinates) on a display unit of the user interface 471. (Hereinafter, this information will be referred to as map coordinates-display unit coordinates association information.)

The data processor 472 is provided with a CPU that executes programs. The data processor 472 conducts processes related to the image viewing program 301, the map display program 302, and the display control program 303 described earlier.

Hereinafter, functions of the data processor 472 related to the display control program 303 will be described. The data processor 472 includes a circling detector. In the case where a user operation is detected with respect to an input unit of the user interface 471 (such as a touchscreen or pointing device), the circling detector detects whether or not that operation is a circling operation in the map display area 103 described earlier. More specifically, a circling operation is detected on the basis of a trail from the contact point at the time of the start of the user operation (start point) to the contact point at the time of the end of the operation (end point) with respect to the input unit. In the case of a circling operation in the map display area 103, the circling detector also detects the circling direction and number of revolutions in the circling operation.

Also, the data processor 472 includes a content item search unit, which determines the area enclosed by a detected circling operation (hereinafter referred to as a selection area). Then, respective display unit coordinates corresponding to the border of the determined selection area are converted into respective map coordinates. In this conversion, the map coordinates-display unit coordinates association information stored in the storage unit is utilized. Herein, methods such as the following three methods given by example below are conceivable as a selection area determination method.

(1) A method of determining a selection area by estimating an approximate midpoint or center point and radius from a circling operation start point and trail (2) A method of determining a selection area by computing an approximate midpoint or center point and radius from the trail of one revolution of a circling operation (3) A method directly taking a trail as a selection area (However, in the case where the trail is not a closed loop, the area enclosed by the trail and a line joining the start point and end point is taken as a selection area.)

Also, the content search unit of the data processor 472 determines whether or not the storage unit 473 is storing image position information (latitude and longitude) included in the latitudes and longitudes indicated by the respective map coordinates on the border of the selection area. If such image position information is being stored, the storage unit 473 is searched for thumbnail image data corresponding to the relevant image position information (latitude and longitude).

Also, the data processor 472 includes a content display quantity adjuster, which modifies the display of thumbnail images related to thumbnail image data found by search with respect to the image list display area 104. For example, in the case where a detected circling direction is a forward direction, relevant thumbnail images may be hidden from the image list display area 104. In contrast, in the case where a circling direction is a reverse direction, relevant thumbnail images may be displayed in the image list display area 104. Herein, the number of thumbnail images to hide/display in the image list display area 104 is determined according to the detected number of revolutions.

The communication unit 474 exchanges information with external apparatus. For example, the communication unit 474 may periodically receive map information from a map server 150, and stores the mostly recently received map information in the storage unit 473. In so doing, the map information stored in the storage unit 473 can be continually kept up-to-date.

Figure 4:
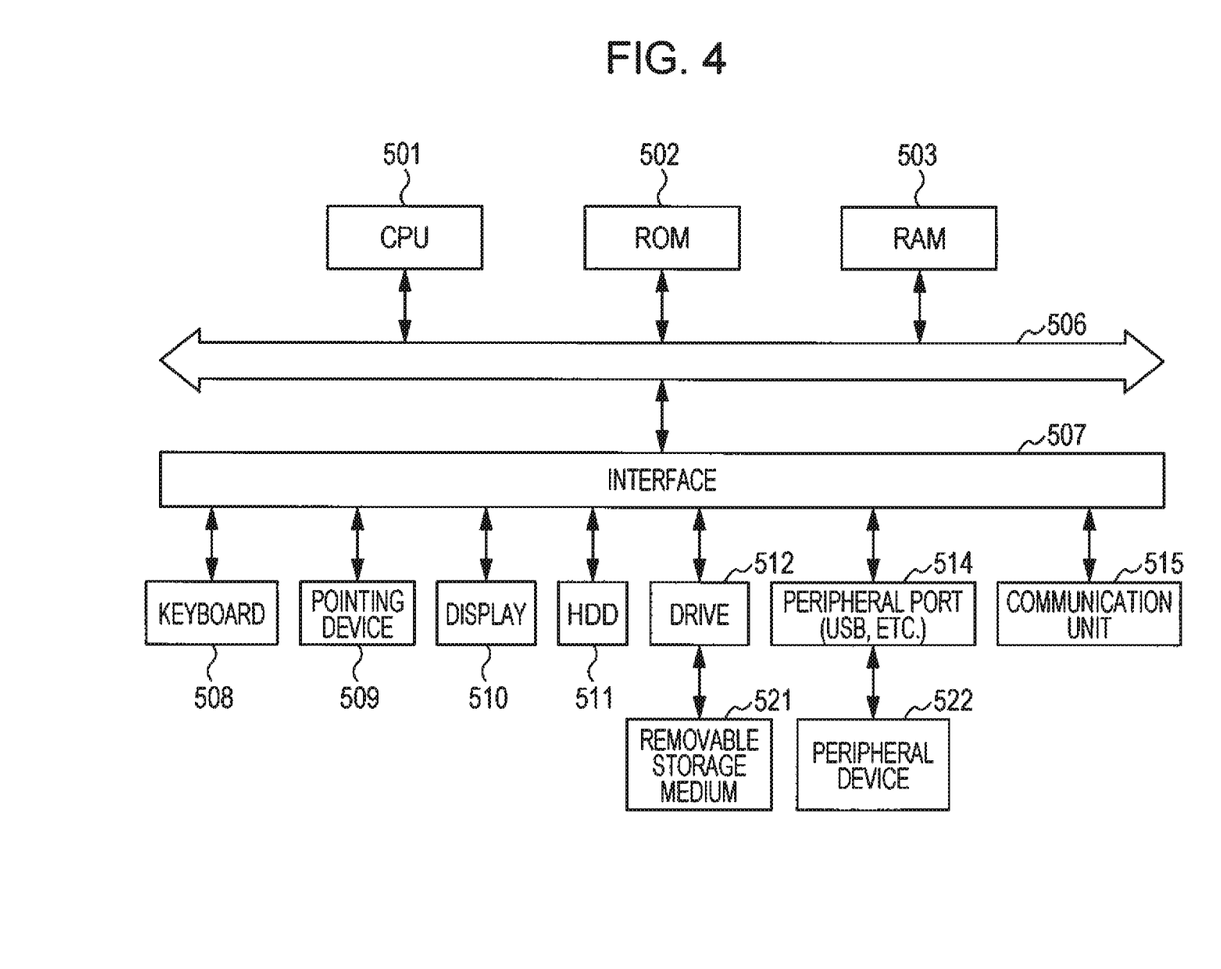
FIG. 4 is a block diagram illustrating a hardware configuration of a display control apparatus in accordance with a first embodiment of the present invention.

Next, an exemplary hardware configuration of a display control apparatus 110 will be described with reference to FIG. 4. FIG. 4 is a block diagram illustrating a hardware configuration of a display control apparatus in accordance with a first embodiment of the present invention. A central processing unit (CPU) 501 functions as the primary executing unit of the data processor 472, and executes various processes in accordance with the image viewing program 301, the map display program 302, and the display control program 303.

Read-only memory (ROM) 502 stores programs used by the CPU 501, or in other words, the image viewing program 301, the map display program 302, the display control program 303, etc. Random access memory (RAM) 503 stores programs used during execution by the CPU 501 and parameters, etc. that change as a result of such execution. The above memory components are coupled to each other by a host bus 506 realized by a CPU bus and similar components.

A keyboard 508 and a pointing device 509 are input devices operated by the user. A display 510 includes a liquid crystal display apparatus having touchscreen functions or a cathode ray tube (CRT), for example, and displays various information as text and images.

A hard disk drive (HDD) 511 drives an internal hard disk, recording or retrieving information and programs executed by the CPU 501. The hard disk is used as storage means for image information and image attributes information, for example. In addition, programs such as data processing programs and various computer programs are stored therein.

A drive 512 reads out data or programs recorded onto a removable recording medium 521 that has been loaded into the drive 512. The recording medium 521 may be a magnetic disk, an optical disc, a magneto-optical disc, semiconductor memory, for example. Data or programs that have been read out are supplied to the RAM 503 coupled via an interface 507 and the host bus 506.

A peripheral port 514 is a port that connects an peripheral device 522, and has a USB, IEEE 1394 or other connector. The peripheral port 514 is coupled to the CPU 501 and other components via the interface 507 and the host bus 506, for example. A communication unit 515 is coupled to a network, and executes communication with a client or network connection server.

(3. Operation of Display Control Apparatus)

Figure 5:
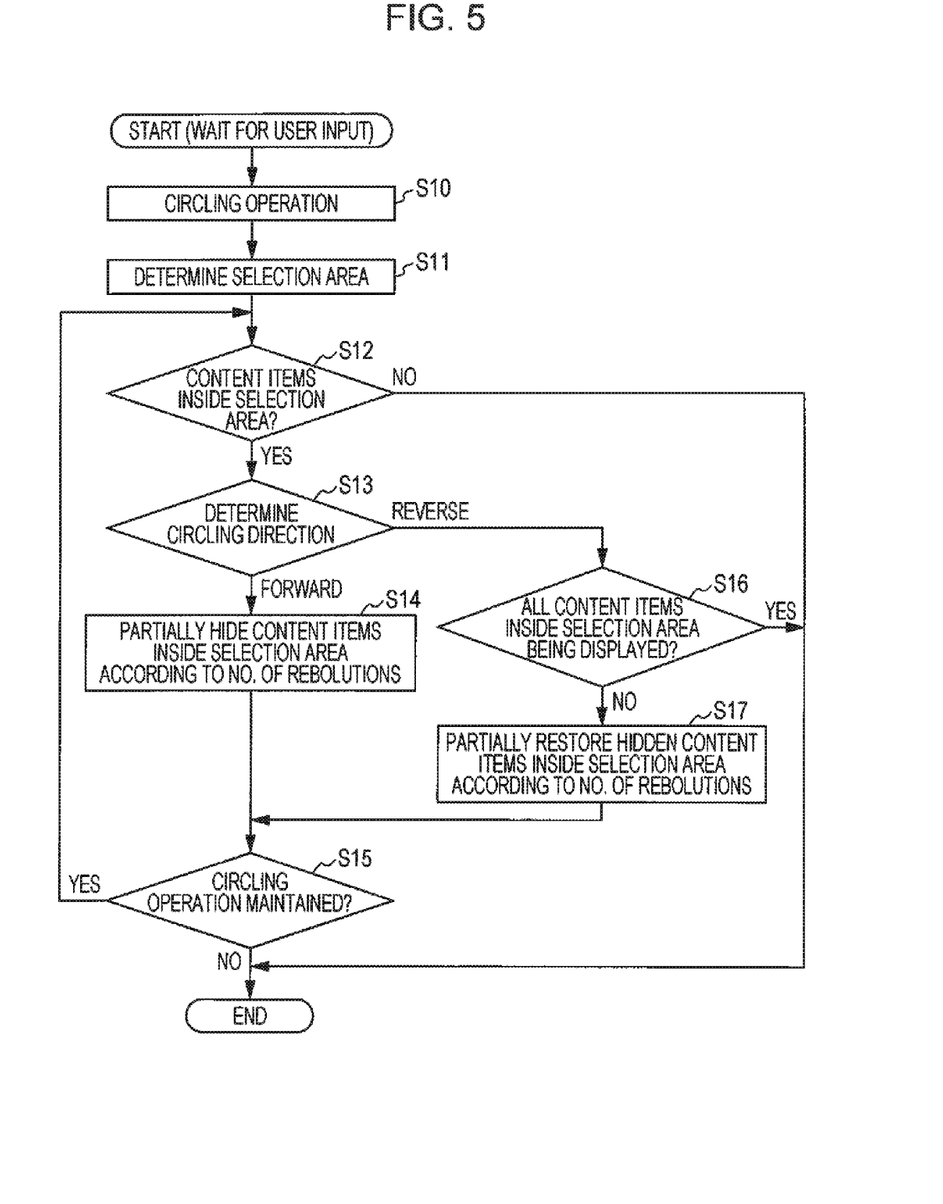
FIG. 5 is a flowchart illustrating operation of a display control apparatus in accordance with a first embodiment of the present invention.

Next, operation of a display control apparatus will be described with reference to FIGS. 5 to 9. FIG. 5 is a flowchart illustrating operation of a display control apparatus in accordance with a first embodiment of the present invention. Herein, it is assumed that a map display program 302 has been executed by the data processor 472 of a display control apparatus 110, and a map display program execution screen 102 is being displayed by a display unit of a user interface 471.

First, the user touches a display control program launch button (not illustrated) on the map display program execution screen 102. In so doing, the data processor 472 initiates a process according to the display control program 303. Then, if a circling operation by the user's finger 601 (see FIG. 6) is detected in the map display area 103 of the map display program execution screen 102 (step S10), the data processor 472 determines a selection area 602 (see FIG. 6) on the basis of the trail given by the circling operation (step S11). At this point, the data processor 472 acquires all respective map coordinates (latitude and longitude) forming the border of the selection area 602 (broken line portion).

Subsequently, the data processor 472 determines whether or not there exist images that were shot inside the selection area 602 (hereinafter referred to as images inside the selection area) (step S12). More specifically, it is determined whether or not the coordinates (latitude and longitude) of points indicated by markers 107 on the map are included in the respective coordinates (latitude and longitude) forming the border of the selection area 602.

If there are no images inside the selection area (step S12, NO), then the data processor 472 terminates the process according to the display control program 303. Herein, the currently set selection area 602 is canceled in the case where the process according to the display control program 303 is terminated.

If there are images inside the selection area (step S12, YES), then the data processor 472 determines the circling direction of the circling operation from the processing in step S10 (step S13).

Figure 7:
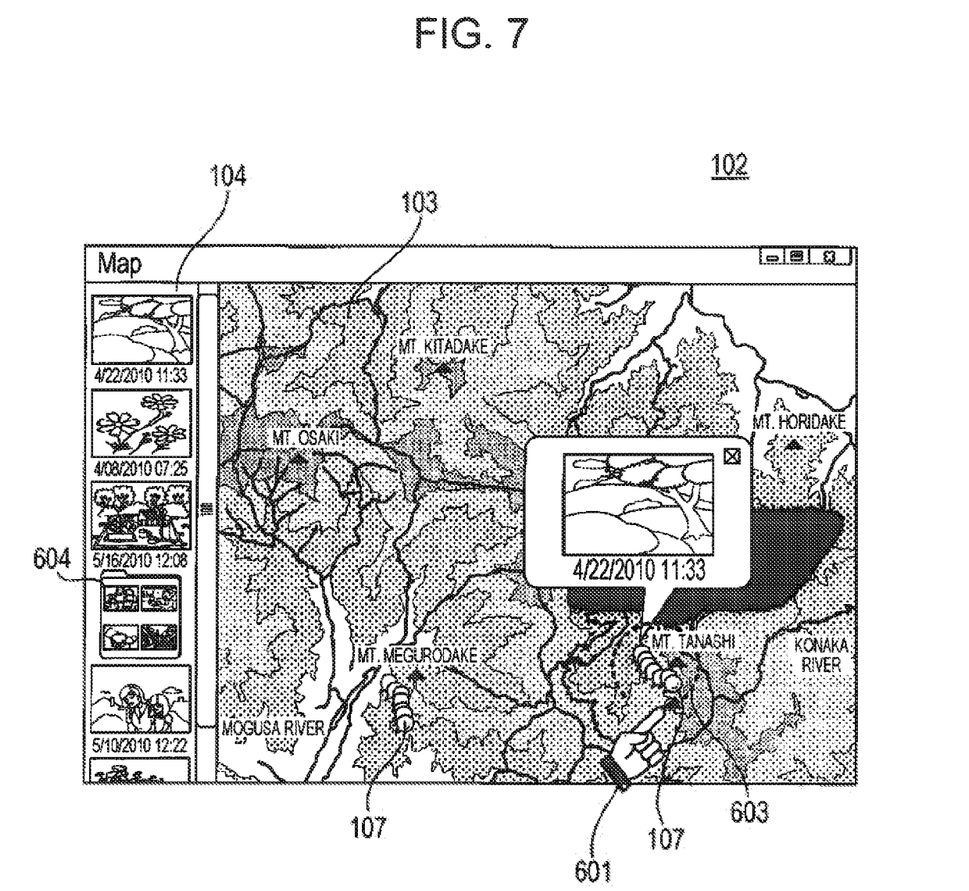
FIG. 7 is an explanatory diagram illustrating a map display program execution screen when executing a display control program.

If the circling direction is a forward (clockwise) direction 603 as illustrated in FIG. 7, then the data processor 472 detects the number of revolutions in circling operation from the processing in step S10. Then, a number of thumbnail images corresponding to images inside the selection area are hidden from the image list display area 104, with the number of hidden thumbnail images corresponding to the detected number of revolutions (step S14). Subsequently, a folder image 604 displaying reduced images of the hidden thumbnail images is generated, and the generated folder image 604 is displayed in the image list display area 104. The scale of the reduced images displayed by the folder image 604 may be modified according to the number of reduced images to be displayed by the folder image 604. Obviously, it may also be configured such that the folder image 604 displays only one or more representative reduced images.

Herein, the order in which to hide thumbnail images of images inside the selection area may be in order of newest or oldest shooting date/time of the images inside the selection area, or in order of shortest distance between the position (latitude and longitude) where an image inside the selection area was shot and the center position (latitude and longitude) of the selection area. Also, the order may follow a fixed rule such as every sixth thumbnail image by file number, or a random order.

After the above processing is completed, the data processor 472 determines whether or not a circling operation in the forward direction 603 is being maintained (step S15). If a circling operation is being maintained (step S15, YES), the data processor 472 returns to the processing in step S12. If a circling operation is not being maintained (step S15, NO), the data processor 472 terminates the process according to the display control program 303.

Figure 8:
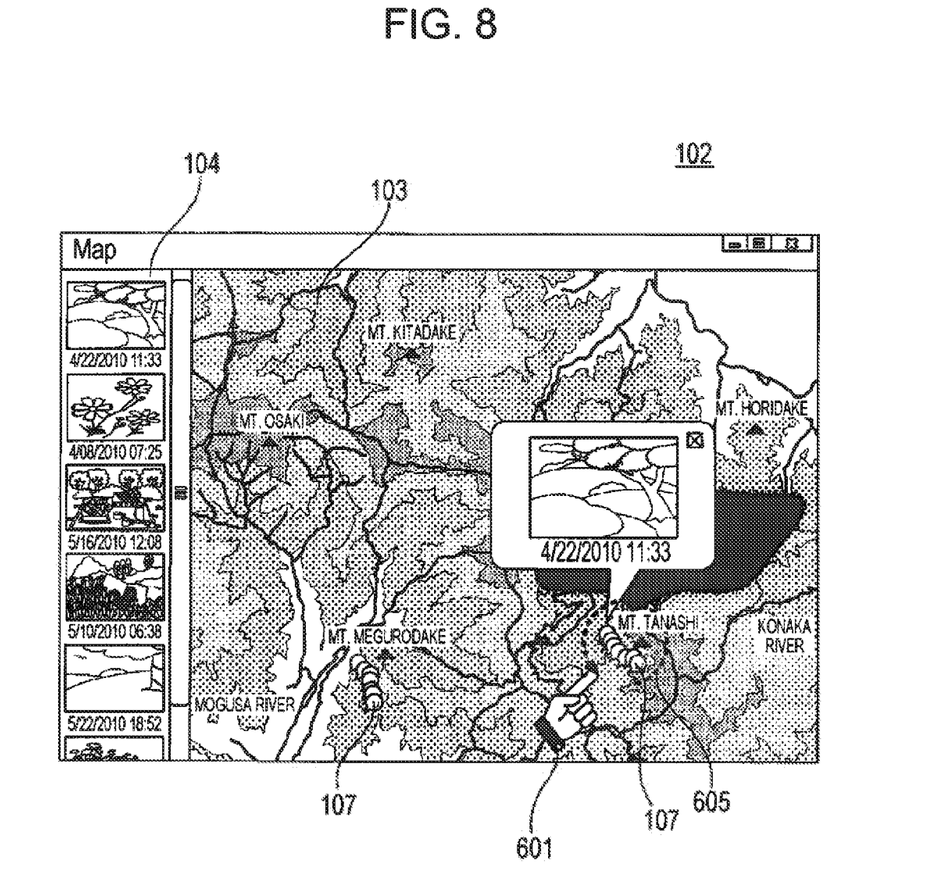
FIG. 8 is an explanatory diagram illustrating a map display program execution screen when executing a display control program.
Figure 9:
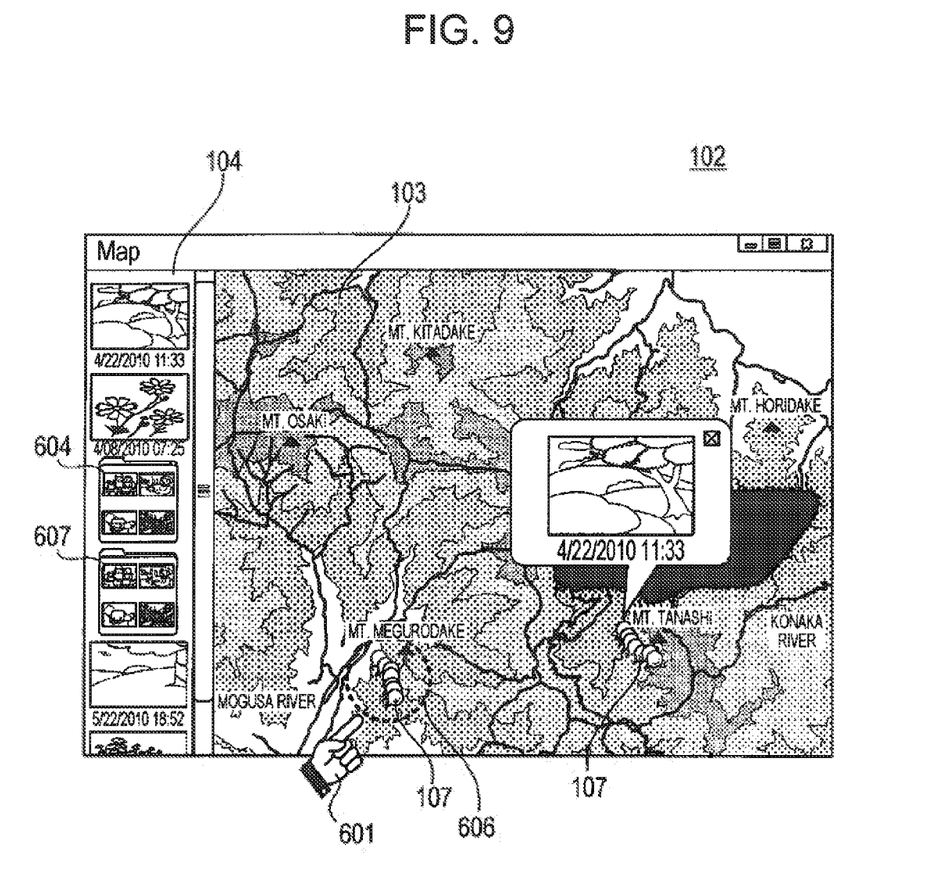
FIG. 9 is an explanatory diagram illustrating a map display program execution screen when executing a display control program.

In contrast, if the circling direction is a reverse (counter-clockwise) direction 605 as illustrated in FIG. 8 in the processing in step S13, then the data processor 472 determines whether or not a folder image corresponding to images inside the selection area like the folder image 604 is being displayed in the image list display area 104 (step S16). If a relevant folder image is not being displayed (step S16, YES), then the data processor 472 terminates the process according to the display control program 303.

If a relevant folder image 604 is being displayed in the image list display area 104 (step S16, NO), then the data processor 472 detects the number of revolutions in the circling operation from the processing in step S10. Then, a number of thumbnail images are displayed in the image list display area 104 in the reverse order that they were hidden by the processing in step S14, with the number of restored thumbnail images corresponding to the detected number of revolutions (step S17). The data processor 472 then proceeds to the processing in step S15. In the processing of this step S17, the folder image 604 is hidden once all thumbnail images that were hidden by the processing in step S14 are displayed.

For example, assume that a process according to a display control program was terminated in a state where a folder image 604 was displayed in the image list display area 104 as illustrated in FIG. 7. If the processing from step S10 to step S15 is executed again, a folder image 607 like that illustrated in FIG. 9 may be displayed in the image list display area 104. However, assume that the selection area 606 set at this point by the processing in step S11 is an area that differs from the selection area 602.

Herein, it is configured such that a display/hide control is conducted for thumbnail images of images that were shot in a selection area on a map in a map display area 103 by the processing in step S14 and step S17 described above. At this point, it may also be configured such that the markers 107 indicating the positions where the parent images of the displayed/hidden thumbnail images were shot are similarly displayed/hidden.

As described above, in a display control apparatus in accordance with a first embodiment of the present invention, thumbnail images for a plurality of images (content items) are displayed on the same screen together with a map having a range that includes the positions where the plurality of images were shot. By conducting a circling operation on the map on this screen, the displayed or hidden state of thumbnail images for images shot in a range enclosed by the circling operation can be controlled on the basis of the direction and number of revolutions in the circling operation. Doing so enables the user to intuitively adjust the number of displayed thumbnail images in the range specified by the circling operation.

For example, consider the case where there are a large number of thumbnail images (content items) to be displayed, and two thumbnail images at distant locations are not displayed on the same screen. In this case, all other thumbnail images between the two thumbnail images of interest can be collectively hidden. As a result, the two thumbnail images of interest can be displayed on the same screen.

Also, in a display control apparatus in accordance with a first embodiment of the present invention, the selection area can be modified any number of times. In so doing, if two different selection areas are set, the number of displayed thumbnail images (content items) corresponding to the position information included in those areas can be separately adjusted. For example, it is possible to respectively adjust the number of displayed thumbnail images in a place where the user wants to view many thumbnail images, and a place where the user wants to view a small number of thumbnail images.

<Second Embodiment>

Figure 10:
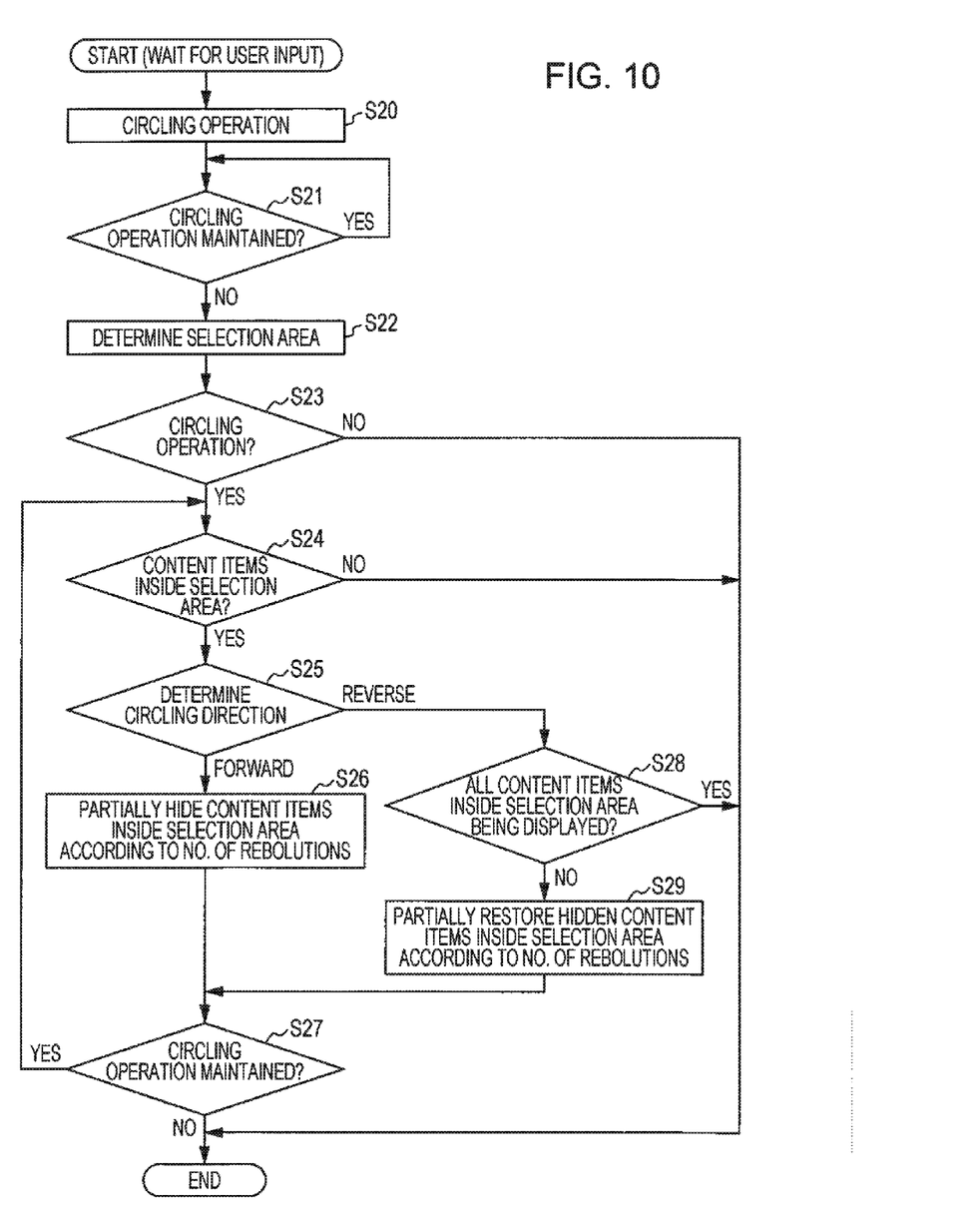
FIG. 10 is a flowchart illustrating operation of a display control apparatus in accordance with a second embodiment of the present invention.

Next, a display control apparatus in accordance with a second embodiment of the present invention will be described with reference to FIG. 10. A display control apparatus in accordance with a second embodiment includes a data processor 472 (circling detector) additionally provided with functions for confirming a selection area with an initial series of circling operations, and controlling the display of thumbnail images in an image list display area 104 according to a circling operation that is performed again after a selection area is confirmed.

(1. Operation of Display Control Apparatus)

Operation of a display control apparatus in accordance with a second embodiment will now be described with reference to FIG. 6 and FIG. 10. FIG. 10 is a flowchart illustrating an operational flow of a display control apparatus in accordance with a second embodiment of the present invention. In this example, it is likewise assumed that a map display program 302 has been executed by the data processor 472 of the display control apparatus, and a map display program execution screen 102 is being displayed. Herein, the processing in step S24 to step S29 in FIG. 10 is similar to the processing in step S12 to step S17 described with FIG. 6, and thus further description thereof is reduced or omitted.

Figure 6:
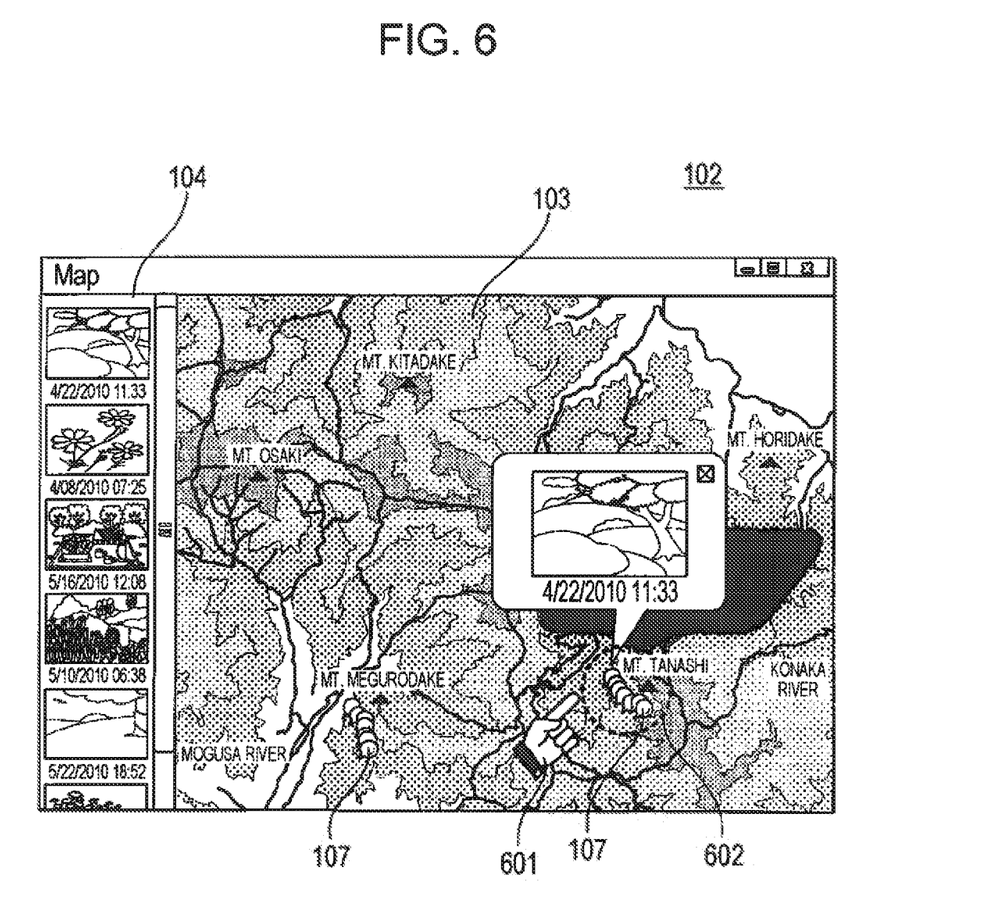
FIG. 6 is an explanatory diagram illustrating a map display program execution screen when executing a display control program.

First, the user touches a display control program launch button (not illustrated) on the map display program execution screen 102 (see FIG. 6). In so doing, the data processor 472 initiates a process according to the display control program. Then, the data processor 472 detects a circling operation by the user's finger 601 in the map display area 103 of the map display program execution screen 102 (step S20). Subsequently, the data processor 472 determines whether or not the circling operation from step S20 is being maintained (step S21). If maintained (step S21, YES), the processing in step S21 is repeated.

If not maintained (step S21, NO), a selection area 602 on the map of the map display area 103 is determined on the basis of the trail given by the circling operation (step S22). At this point, the data processor 472 acquires all respective map coordinates (latitude and longitude) forming the border of the selection area 602 (broken line portion).

After the above processing is completed, the data processor 472 determines whether or not an additional circling operation has been performed with respect to the display unit of the user interface 471 within a given amount of time (step S23). If a circling operation is not performed within the given amount of time (step S23, NO), the data processor 472 terminates the process according to the display control program 303. If a circling operation is performed within the given amount of time (step S23, YES), the data processor 472 proceeds to the processing in step S24.

As described above, in a display control apparatus in accordance with a second embodiment of the present invention, an initial circling operation is performed, and the range enclosed by the circling operation is determined as a selection area. Then, if an additional circling operation is performed, the displayed or hidden state of thumbnail images (content items) for images shot in the selection area is controlled on the basis of the direction and number of revolutions in the circling operation, similarly to the first embodiment. In so doing, respective advantages similar to those of a display control apparatus in accordance with the first embodiment are obtained.

Also, in a display control apparatus in accordance with the second embodiment of the present invention, it is possible to adjust just the number of displayed thumbnail images (content items) corresponding to position information included in a selection area determined by an initial circling operation, even if the positions of the initial circling operation and the additional circling operation are different.

<Third Embodiment>

Figure 11:
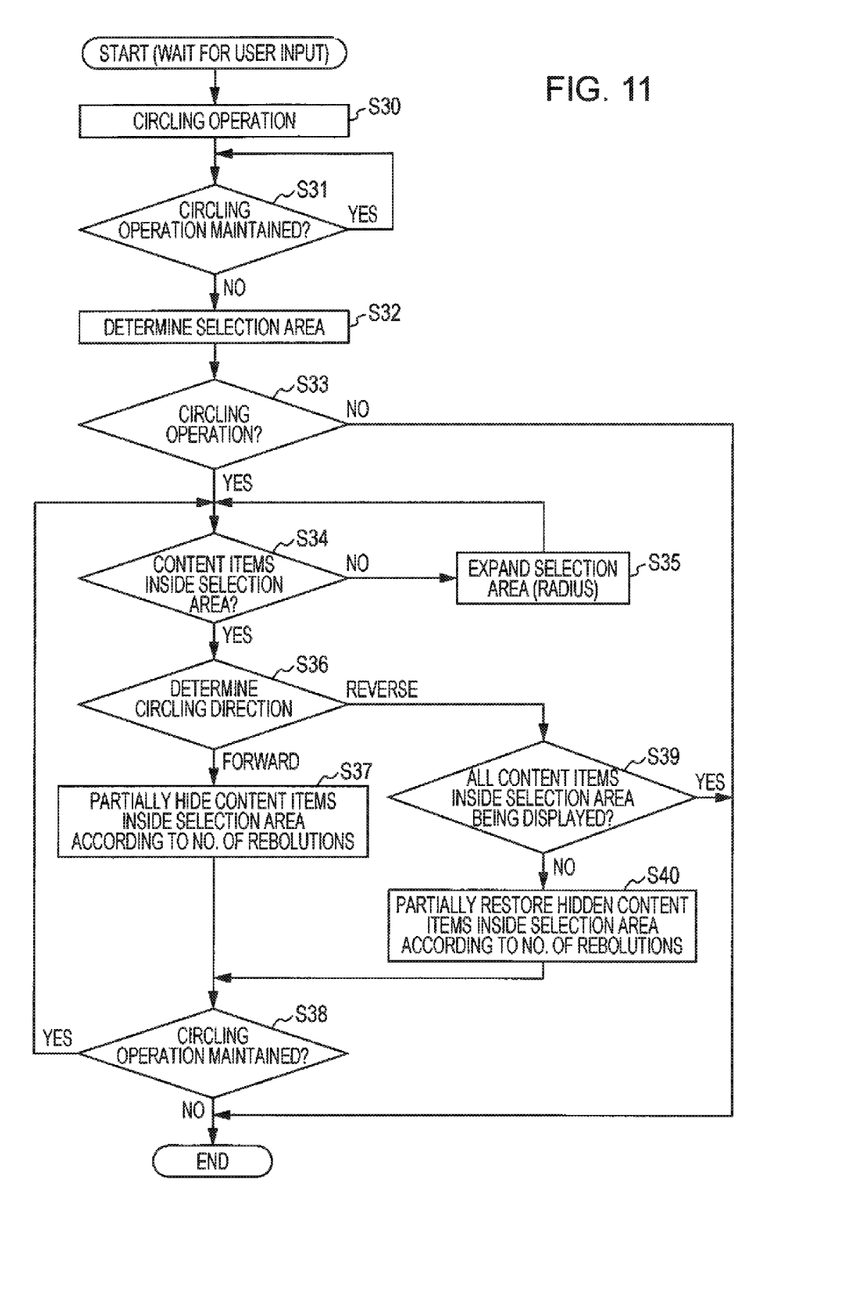
FIG. 11 is a flowchart illustrating operation of a display control apparatus in accordance with a third embodiment of the present invention.

Next, a display control apparatus in accordance with a third embodiment of the present invention will be described with reference to FIG. 11. A display control apparatus in accordance with a third embodiment includes a data processor 472 (circling detector) provided with the respective functions of a display control apparatus in accordance with the second embodiment, as well as a function for increasing the radius (range) of a selection area in the case where there are no images that were shot inside the selection area.

(1. Operation of Display Control Apparatus)

Operation of a display control apparatus in accordance with a third embodiment will now be described with reference to FIG. 6 and FIG. 11. FIG. 11 is a flowchart illustrating a flow of operation in a display control apparatus in accordance with a third embodiment of the present invention. In this example, it is likewise assumed that a map display program 302 has been executed by the data processor of the display control apparatus, and a map display program execution screen 102 (see FIG. 6) is being displayed. Herein, the processing in step S30 to step S33 in FIG. 11 is similar to the processing in step S20 to step S23 described with FIG. 10, and the processing in step S36 to step S40 is similar to the processing in step S13 to step S17 described with FIG. 5. For this reason, further description thereof is reduced or omitted.

In step S33, if an additional circling operation is detected (step S33, YES), the data processor determines whether or not there exist images inside the selection area, i.e., images that were shot inside the selection area (step S34). More specifically, it is determined whether or not the coordinates (latitude and longitude) of points indicated by markers 107 on the map are included in the respective coordinates (latitude and longitude) forming the border of the selection area.

If there are images inside the selection area (step S34, YES), then the data processor proceeds to the processing in step S36. If there are no images inside the selection area (step S34, NO), then the data processor enlarges the selection area by lengthening the radius of the current selection area by a given ratio (step S35). At this point, the data processor acquires and updates the respective coordinates (latitude and longitude) forming the border of the enlarged selection area. After the above processing is completed, the data processor returns to the processing in step S34. Herein, a display control apparatus in accordance with the first embodiment may also be configured such that the processing in these steps S34 and S35 is executed instead of the processing in step S12.

As described above, in a display control apparatus in accordance with a third embodiment of the present invention, a range enclosed by an initial circling operation is determined as a selection area, similarly to a display control apparatus in accordance with the second embodiment. Then, if an additional circling operation is conducted, the displayed or hidden state of thumbnail images (content items) for images shot in the selection area is controlled on the basis of the direction and number of revolutions in the circling operation. In so doing, respective advantages similar to those of a display control apparatus in accordance with the second embodiment are obtained.

Also, in a display control apparatus in accordance with a third embodiment of the present invention, the extent of a selection area determined by an initial circling operation can be automatically enlarged in the case where there exist no thumbnail images (content items) corresponding to position information included in the selection area. Thus, if a circling operation is repeated multiple times, it is ultimately possible to control the displayed/hidden state of all thumbnail images (content items) other than the thumbnail images corresponding to position information included in the selection area determined by the initial operation. Such display/hide control can suggest a whirlwind-like motion to the user, and is highly entertaining.

<Fourth Embodiment>

In the respective embodiments described above, the displayed/hidden state of markers 107 included in a selection area 602 (see FIG. 6) can be controlled. A display control apparatus in accordance with a fourth embodiment is a utilization of this technology. Hereinafter, a display control apparatus in accordance with a fourth embodiment will be described with reference to FIGS. 12A to 12D.

FIGS. 12A to 12D illustrate a display unit of a display control apparatus in accordance with a fourth embodiment. Herein, icons for a plurality of files (hereinafter referred to as file icons) 701 are being displayed on the display unit. In this example, the file icons 701 are equivalent to content items.

Figure 12A:
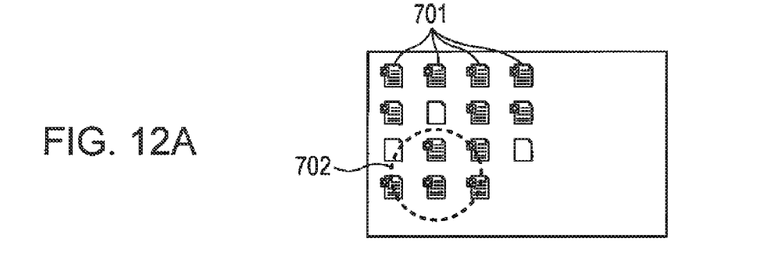
FIGS. 12A to 12D are explanatory diagrams illustrating a display control apparatus in accordance with a fourth embodiment of the present invention.
Figure 12B:
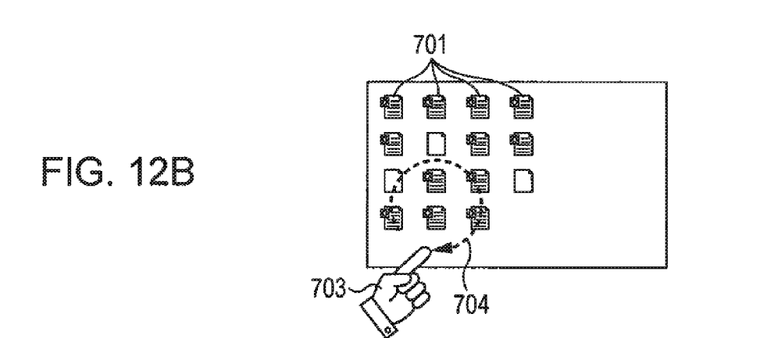

First, the user traces the border of an area 702 on the display unit with a finger 703 (see FIG. 12A), and repeatedly conducts a circling operation in a forward direction 704 (see FIG. 12B). In so doing, a data processor 472 hides a number of file icons 701 at positions overlapping the area 702, with the number of hidden file icons 701 corresponding to the number of revolutions in the circling operation, similarly to display control apparatus in accordance with the first through the third embodiments. At this point, a new folder image 705 is generated and displayed on the display unit (see FIG. 12C).

Figure 12C:
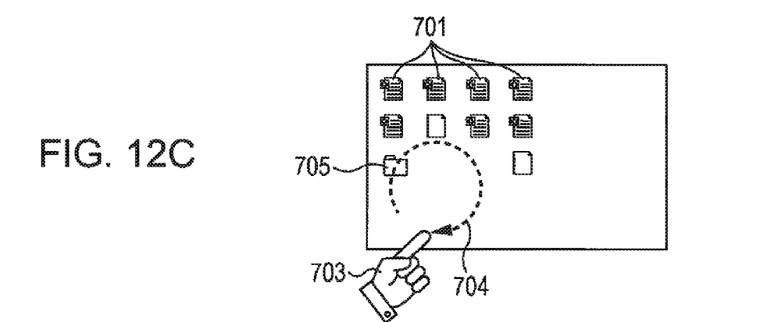
Figure 12D:
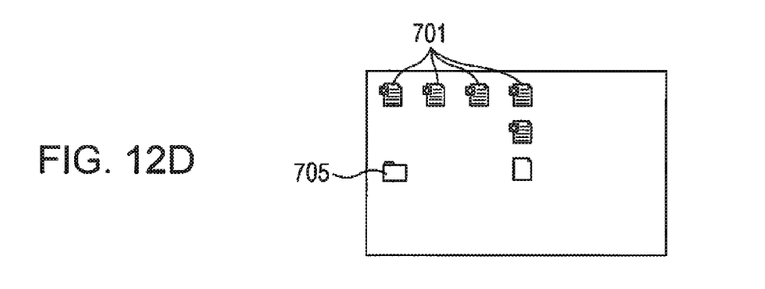

In the case where the circling operation is further maintained at this stage, the data processor 472 hides file icons 701 outside the area 702 in order of closest distance from the center of the area 702, similarly to a display control apparatus in accordance with the third embodiment (see FIG. 12D).

In the case of restoring hidden file icons 701, a circling operation in the reverse direction of the forward direction 704 may be conducted so as to include the folder image 705, similarly to display control apparatus in accordance with the first through the third embodiments.

Although the display control apparatus was taken to be a PC in the respective embodiments described above, the display control apparatus is not limited to being a PC, and may also be an apparatus such as a digital still camera, a mobile phone, or car navigation device. For example, in the case of a car navigation device, there may be cases in which too many place icons (content items) are displayed on a display unit and obscured. In such cases, the number of place icons (content items) displayed on the display unit may be adjusted to a suitable number by conducting circling operations as described in the first through the third embodiments.

Also, although a display control apparatus in accordance with the respective embodiments described above was configured to allow one selection area to be set at a time, two or more selection areas may also be set at a time. Doing so may save operation labor in cases where the user wants to apply the same display processing to content items in separate locations.

In a display control apparatus in accordance with the respective embodiments described above, a circling operation was taken to draw a round shape. However, the circling operation is not limited to a round shape, and may also be an operation that draws any shape, such as a square shape, triangular shape, or star shape, for example. Doing enables a selection area to be freely set, thereby raising the efficiency of content display/hide control.

Also, although a display control apparatus in accordance with the respective embodiments described above is configured to display popup images in a map display area (see FIG. 1), a display control apparatus may also be configured to not display popup images. In so doing, the user becomes able to check the map in portions obscured by popup images.

The foregoing thus describes respective exemplary embodiments, but obviously the present invention is not limited to the respective embodiments above, and other modifications and applications are possible without departing from the gist of the present invention stated in the claims.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus, comprising:
   an input unit configured to be operated to change a display state of a plurality of content items displayed on a display screen;
   a circling detector configured to detect whether or not a user operation is a circling operation from a trail from a start point to an end point of a user operation with respect to the input unit such that an arbitrary position on the display screen is enclosed, such that if the detection result indicates a circling operation, the circling detector detects whether a circling direction is a first direction or a second direction which is opposite to the first direction and detects a number of revolutions in the circling operation, and also determines the area on the display screen enclosed by the trail to be a selection area;
   a content item search unit configured to search the plurality of content items for relevant content items that correspond to position information included inside the selection area; and
   a content display quantity adjuster configured to display or hide the relevant content items according to the circling direction, and in the case of a plurality of relevant content items, determine the number of relevant content items to display or hide from among the relevant content items on the basis of the number of revolutions, such that when the circling direction is detected to be the first direction the determined number of relevant content items are displayed and when the circling direction is detected to be the second direction the determined number of relevant content items are hidden.

2. The display control apparatus according to claim 1, wherein the circling detector enlarges the size of the selection area in the case where relevant content items are not found by the content search unit.

3. The display control apparatus according to claim 1, wherein
   the display screen includes an image list display area where the plurality of content items is displayed, and a map display area where a map including positions indicated by position information corresponding to the plurality of content items is displayed, and
   the circling operation is conducted with respect to the map display area.

4. The display control apparatus according to claim 3, wherein
   markers are displayed on a map displayed in the map display area at positions indicated by position information corresponding to the plurality of content items, and
   the display quantity adjuster displays or hides markers displayed at positions expressed by position information corresponding to relevant content items to be displayed or hidden.

5. The display control apparatus according to claim 1, wherein
   the selection area is determined on the basis of the trail of the first revolution of the circling operation, and the displaying or hiding of relevant content items as well as the number of items to display or hide is determined on the basis of the circling direction and number of revolutions, respectively, in the second and subsequent revolutions of the circling operation.

6. The display control apparatus according to claim 1, wherein
   a plurality of selection areas can be set simultaneously.

7. The display control apparatus according to claim 1, wherein
   the content display quantity adjuster displays a folder image displaying reduced images of relevant content items that have been hidden.

8. The display control apparatus according to claim 7, wherein
   the content display quantity adjuster modifies the scale of the reduced images such that the reduced images for relevant content items that have been hidden are all displayed in the folder image.

9. The display control apparatus according to claim 1, wherein the input unit is a touchscreen.

10. A display control method, comprising the steps of:
    in the case where an input unit operated in order to change the display state of a plurality of content items displayed on a display screen is subjected to a user operation so as to enclose an arbitrary position on the display screen, detecting whether or not the user operation is a circling operation from a trail from a start point to an end point of the user operation, and if the detection result indicates a circling operation, detecting whether a circling direction is a first direction or a second direction which is opposite to the first direction and detecting a number of revolutions in the circling operation, and determining the area on the display screen enclosed by the trail to be a selection area;
    searching the plurality of content items for relevant content items that correspond to position information included inside the selection area; and
    displaying or hiding the relevant content items are according to the circling direction, and in the case of a plurality of relevant content items, determining the number of relevant content items to display or hide from among the relevant content items on the basis of the number of revolutions, such that when the circling direction is detected to be the first direction the determined number of relevant content items are displayed and when the circling direction is detected to be the second direction the determined number of relevant content items are hidden.

11. A non-transitory computer-readable recording medium having stored thereon a display control program causing a computer to function as:

circling detecting means configured such that, in the case where an input unit operated in order to change the display state of a plurality of content items displayed on a display screen is subjected to a user operation so as to enclose an arbitrary position on the display screen, the circling detecting means detects whether or not the user operation is a circling operation from a trail from a start point to an end point of the user operation, such that if the detection result indicates a circling operation, the circling detecting means detects whether a circling direction is a first direction or a second direction which is opposite to the first direction and detects a number of revolutions in the circling operation, and also determines the area on the display screen enclosed by the trail to be a selection area;

content item searching means configured to search the plurality of content items for relevant content items that correspond to position information included inside the selection area; and content display quantity adjusting means configured to display or hide the relevant content items according to the circling direction, and in the case of a plurality of relevant content items, determine the number of relevant content items to display or hide from among the relevant content items on the basis of the number of revolutions, such that when the circling direction is detected to be the first direction the determined number of relevant content items are displayed and when the circling direction is detected to be the second direction the determined number of relevant content items are hidden.

12. A non-transitory computer-readable recording medium having stored thereon a display control program causing a computer to function as:

a circling detector configured such that, in the case where an input unit operated in order to change the display state of a plurality of content items displayed on a display screen is subjected to a user operation so as to enclose an arbitrary position on the display screen, the circling detector detects whether or not the user operation is a circling operation from a trail from a start point to an end point of the user operation, such that if the detection result indicates a circling operation, the circling detector detects whether a circling direction is a first direction or a second direction which is opposite to the first direction and detects a number of revolutions in the circling operation, and also determines the area on the display screen enclosed by the trail to be a selection area;

a content item search unit configured to search the plurality of content items for relevant content items that correspond to position information included inside the selection area; and a content display quantity adjuster configured to display or hide the relevant content items according to the circling direction, and in the case of a plurality of relevant content items, determine the number of relevant content items to display or hide from among the relevant content items on the basis of the number of revolutions, such that when the circling direction is detected to be the first direction the determined number of relevant content items are displayed and when the circling direction is detected to be the second direction the determined number of relevant content items are hidden.

* * * * *